United States Patent
Yagi et al.

(10) Patent No.: US 11,926,563 B2
(45) Date of Patent: Mar. 12, 2024

(54) CRYSTALLIZED GLASS SUBSTRATE

(71) Applicant: OHARA INC., Kanagawa (JP)

(72) Inventors: Toshitaka Yagi, Kanagawa (JP); Kohei Ogasawara, Kanagawa (JP)

(73) Assignee: OHARA INC., Kanagawa (JP)

(*) Notice: Subject to any disclaimer, the term of this patent is extended or adjusted under 35 U.S.C. 154(b) by 356 days.

(21) Appl. No.: 17/296,983

(22) PCT Filed: Dec. 21, 2018

(86) PCT No.: PCT/JP2018/047163
§ 371 (c)(1),
(2) Date: May 26, 2021

(87) PCT Pub. No.: WO2020/129230
PCT Pub. Date: Jun. 25, 2020

(65) Prior Publication Data
US 2022/0024802 A1    Jan. 27, 2022

(51) Int. Cl.
*C03C 3/087* (2006.01)
*C03C 10/00* (2006.01)

(52) U.S. Cl.
CPC .......... *C03C 3/087* (2013.01); *C03C 10/0018* (2013.01)

(58) Field of Classification Search
CPC ... C03C 3/087; C03C 10/0018; C03C 21/002; C03C 21/00; C03C 10/0045; C03C 10/00
See application file for complete search history.

(56) References Cited

U.S. PATENT DOCUMENTS

2016/0355434 A1* 12/2016 Momono ............ C03C 10/0018
2019/0352226 A1* 11/2019 Harris ................ C03C 21/002

FOREIGN PATENT DOCUMENTS

| CN | 107108345 A | 8/2017 |
|---|---|---|
| JP | 2014114200 A | 6/2014 |
| JP | 2017506207 A | 3/2017 |
| WO | WO2017126605 A1 | 7/2017 |
| WO | WO2018144554 A1 | 8/2018 |
| WO | WO2018154973 A1 | 8/2018 |
| WO | WO2019003565 A1 | 1/2019 |

* cited by examiner

*Primary Examiner* — Bryan D. Ripa
*Assistant Examiner* — Cameron K Miller
(74) *Attorney, Agent, or Firm* — Li & Cai Intellectual Property Office

(57) ABSTRACT

Provided is a crystallized glass substrate including a surface with a compressive stress layer, in which a gradient A of a surface compressive stress from an outermost surface to a depth of 6 μm in the compressive stress layer is 50.0 to 110.0 MPa/μm, a gradient B of a surface compressive stress from a depth of (a stress depth DOLzero—10 μm) to the stress depth DOLzero is 2.5 to 15.0 MPa/μm, where the stress depth DOLzero is a depth of the compressive stress layer at a surface compressive stress of 0 MPa, and a hardness of the outermost surface at an indentation depth of 20 nm is 7.50 to 9.50 GPa.

13 Claims, 1 Drawing Sheet

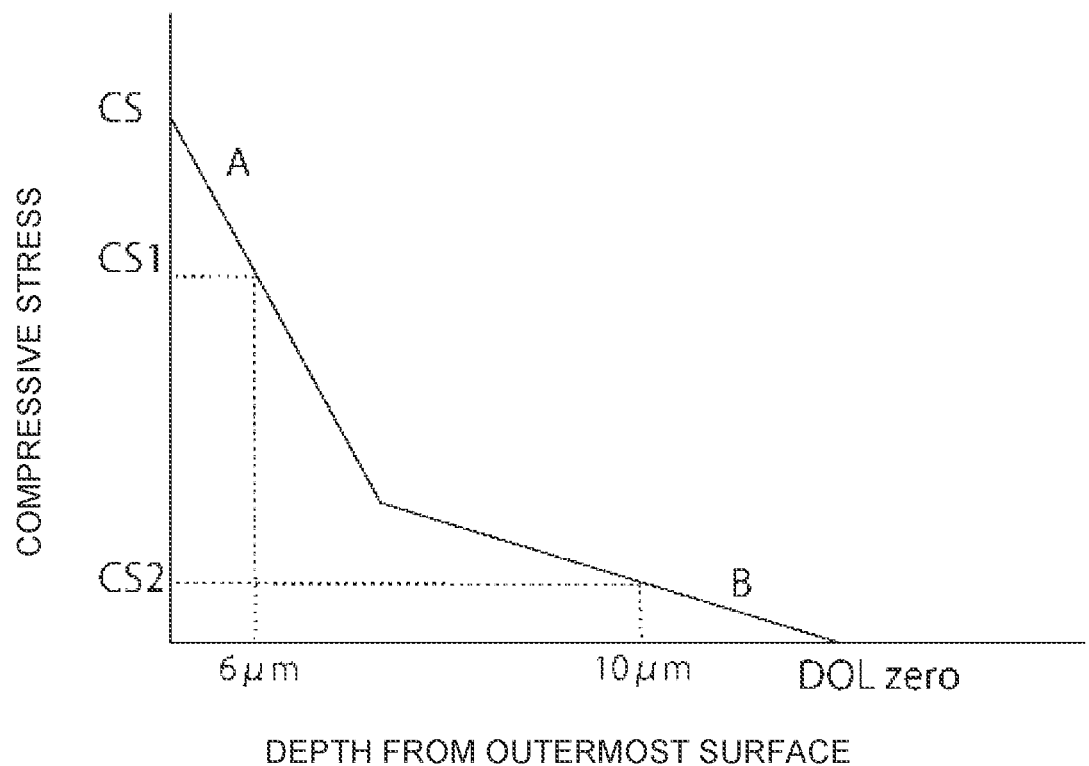

CRYSTALLIZED GLASS SUBSTRATE

FIELD OF THE DISCLOSURE

The present disclosure relates to a crystallized glass substrate including a surface with a compressive stress layer.

BACKGROUND OF THE DISCLOSURE

A cover glass for protecting a display is used in a portable electronic device such as a smartphone or a tablet PC. A protector for protecting a lens is also used in an in-vehicle optical device. In recent years, there is a demand for a use in a housing or the like serving as an exterior of an electronic device. There is an increasing demand for a harder material so that these devices can withstand more rigorous use.

Conventionally, chemically strengthened glass is employed for a material for use in a protective member and the like. However, conventional chemically strengthened glass extremely decreases in strength if cracking vertically from the glass surface, and thus, there is a problem in that the conventional chemically strengthened glass often breaks when a portable device is dropped. Furthermore, if the conventional chemically strengthened glass is broken, there is a risk of injuries when the glass is crushed and scattered into pieces. Therefore, it is required that the glass is crushed into large pieces when the glass is destroyed.

Patent Document 1 discloses a crystallized glass substrate for an information recording medium. However, when this crystallized glass substrate is chemically strengthened, it is not possible to achieve a sufficient compressive stress value.

PRIOR ART DOCUMENT

Patent Document

[Patent Document 1] Japanese Unexamined Patent Application Publication No. 2014-114200

SUMMARY OF THE DISCLOSURE

The present disclosure has been made in view of the above problem. An object of the present disclosure is to achieve a hard and near-unbreakable crystallized glass substrate.

As a result of intensive studies to solve the problems mentioned above, the present inventors discovered that it was possible to achieve a crystallized glass substrate in which while a surface compressive stress of a compressive stress layer was increased by being chemically strengthened using a mixed acid, a central compressive stress could be lowered, and thus, high impact resistance was achieved, so that, even if breaking due to an impact, the crystallized glass substrate was unlikely to break into small pieces (break explosively), as a result, the inventors have completed the present invention. Specifically, the present disclosure provides the following configurations.

(Configuration 1)

A crystallized glass substrate including a surface with a compressive stress layer,
  in which a gradient A of a surface compressive stress from an outermost surface to a depth of 6 μm in the compressive stress layer is 50.0 to 110.0 MPa/μm,
  a gradient B of a surface compressive stress from a depth of (a stress depth DOLzero—10 μm) to the stress depth DOLzero is 2.5 to 15.0 MPa/μm,
  where the stress depth DOLzero is a depth of the compressive stress layer at a surface compressive stress of 0 MPa, and
  a hardness of the outermost surface at an indentation depth of 20 nm is 7.50 to 9.50 GPa.

(Configuration 2)

A crystallized glass substrate including a surface with a compressive stress layer,
  in which a gradient A of a surface compressive stress from an outermost surface to a depth of 6 μm in the compressive stress layer is 50.0 to 110.0 MPa/μm,
  a gradient B of a surface compressive stress from a depth of (a stress depth DOLzero—10 μm) to the stress depth DOLzero is 2.5 to 15.0 MPa/μm,
  where the stress depth DOLzero is a depth of the compressive stress layer at a surface compressive stress of 0 MPa, and
  a hardness of the outermost surface at an indentation depth of 100 nm is 8.00 to 9.50 GPa.

(Configuration 3)

A crystallized glass substrate including a surface with a compressive stress layer,
  in which a gradient A of a surface compressive stress from an outermost surface to a depth of 6 μm in the compressive stress layer is 50.0 to 110.0 MPa/μm,
  a gradient B of a surface compressive stress from a depth of (a stress depth DOLzero—10 μm) to the stress depth DOLzero is 2.5 to 15.0 MPa/μm,
  where the stress depth DOLzero is a depth of the compressive stress layer at a surface compressive stress of 0 MPa, and
  a surface compressive stress CS on the outermost surface of the compressive stress layer is 900.0 to 1200.0 MPa.

(Configuration 4)

The crystallized glass substrate according to configuration 1 or 2,
  in which the stress depth DOLzero is 30.0 to 70.0 μm,
  a surface compressive stress CS on an outermost surface of the compressive stress layer is 870.0 to 1150.0 MPa, and
  a central compressive stress CT is 35.0 to 70.0 MPa.

(Configuration 5)

The crystallized glass substrate according to any one of configurations 1 to 4, including, by wt % in terms of oxide,
  40.0% to 70.0% of a $SiO_2$ component,
  11.0% to 25.0% of an $Al_2O_3$ component,
  5.0% to 19.0% of a $Na_2O$ component,
  0% to 9.0% of a $K_2O$ component,
  1.0% to 18.0% of one or more selected from a MgO component and a ZnO component,
  0% to 3.0% of a CaO component, and
  0.5% to 12.0% of a $TiO_2$ component.

(Configuration 6)

The crystallized glass substrate according to any one of configurations 1 to 5, in which a thickness of the crystallized glass substrate is 0.1 to 1.0 mm.

According to the present disclosure, it is possible to obtain a hard and near-unbreakable crystallized glass substrate.

It is possible to use the crystallized glass substrate according to the present disclosure for a display of an electronic device, a lens cover glass, a lens protector for an in-vehicle optical device, an outer frame member or a housing, an optical lens material, and various types of other members.

BRIEF DESCRIPTION OF THE DRAWINGS

FIG. 1 is a graph showing an example of a change in compressive stress with respect to a depth from an outermost surface of a crystallized glass substrate according to the present disclosure.

DETAILED DESCRIPTION OF THE EXEMPLARY EMBODIMENTS

Embodiments and examples of a crystallized glass substrate according to the present disclosure will be described below in detail, but the present disclosure is not limited to the following embodiments and examples, and may be implemented with appropriate changes within the scope of the object of the present disclosure.

[Crystallized Glass Substrate]

A crystallized glass substrate according to the present disclosure uses crystallized glass as a base material (also referred to as "crystallized glass base material") and includes a surface with a compressive stress layer. The compressive stress layer may be formed by subjecting the crystallized glass base material to an ion exchange treatment. The compressive stress layer is formed to have a predetermined thickness from an outermost surface of the substrate to the inside, and a compressive stress is highest on the outermost surface, and decreases toward the inside to reach zero.

FIG. 1 is a graph showing an example of a change in compressive stress (MPa) with respect to a depth (μm) from an outermost surface in a compressive stress layer in a surface portion of a crystallized glass substrate according to the present disclosure. A portion with a depth of zero refers to the outermost surface. The compressive stress of the outermost surface (also referred to as outermost surface compressive stress) is expressed by CS, and the depth of the compressive stress layer (also referred to as stress depth) when the compressive stress is 0 MPa is expressed by DOLzero. In FIG. 1, the compressive stress suddenly decreases inward from the outermost surface (at a large slope), and then gradually decreases (at a small slope).

Specifically, a gradient A of the compressive stress from the outermost surface to a depth of 6 μm is 50.0 to 110.0 MPa/μm, preferably 60.0 to 105.0 MPa/μm, or 70.0 to 100.0 MPa/μm. A gradient B of the compressive stress from a depth of (stress depth DOLzero—10 μm) to the stress depth DOLzero is 2.5 to 15.0 MPa/μm, preferably 3.0 to 13.0 MPa/μm, or 3.5 to 12.0 MPa/μm. In FIG. 1, the gradient A is determined by (CS-CS1)/6, where CS1 is the compressive stress at a depth of 6 μm from the outermost surface. The gradient B is determined by CS2/10, where CS2 is the compressive stress of a shallow portion at 10 μm from the stress depth DOLzero.

The compressive stress CS of the outermost surface of the compressive stress layer is usually 870.0 to 1200.0 MPa, and may be 900.0 to 1200.0 MPa, 930.0 to 1150.0 MPa, 950.0 to 1100.0 MPa, or 960.0 to 1050.0 MPa, for example.

A stress depth DOLzero determined by curve analysis may be 30.0 to 70.0 μm, and may be 35.0 to 60.0 μm, or 38.0 to 58.0 μm, for example.

A stress depth DOLzero determined by linear analysis may be 40.0 to 80.0 μm, and may be 45.0 to 75.0 μm or 50.0 to 70.0 μm, for example.

A central stress CT determined by curve analysis may be 35.0 to 70.0 MPa, and may be 38.0 to 65.0 MPa, or 40.0 to 60.0 MPa, for example.

The hardness of the crystallized glass substrate at an indentation depth of 20 nm is preferably 7.50 to 9.50 GPa, more preferably 7.80 to 9.30 GPa, and still more preferably 8.00 to 9.10 GPa.

The hardness of the crystallized glass substrate obtained when the crystallized glass substrate is pressed from the outermost surface of the crystallized glass substrate to a depth of 50 nm (hardness at an indentation depth of 50 nm) is preferably 7.50 to 9.50 GPa, more preferably 7.80 to 9.30 GPa, and still more preferably 8.00 to 9.10 GPa.

The hardness of the crystallized glass substrate at an indentation depth of 100 nm is preferably 8.00 to 9.50 GPa, more preferably 8.30 to 9.30 GPa, and still more preferably 8.50 to 9.10 GPa.

The hardness of the crystallized glass substrate at an indentation depth of 20 nm is preferably 8.00 to 9.50 GPa, more preferably 8.30 to 9.30 GPa, and still more preferably 8.50 to 9.10 GPa.

The above-mentioned hardness can be determined by the method described in the Examples.

If the compressive stress layer has the above-mentioned stress gradients A and B, hardness, and/or outermost surface compressive stress CS, the substrate is unlikely to break. The stress depth, the stress gradient, the hardness, the outermost surface compressive stress, and the central stress may be adjusted by adjusting a composition, a thickness of the substrate, and a chemical strengthening condition.

A lower limit of a thickness of the crystallized glass substrate is preferably 0.10 mm or more, more preferably 0.30 mm or more, still more preferably 0.40 mm or more, yet still more preferably 0.50 mm or more, and an upper limit of the thickness of the crystallized glass substrate is preferably 1.00 mm or less, more preferably 0.90 mm or less, still more preferably 0.70 mm or less, and yet still more preferably 0.60 mm or less.

The crystallized glass is a material having a crystalline phase and a glass phase, and is distinguished from an amorphous solid. Generally, the crystal phase of the crystallized glass is determined by using a peak angle appearing in an X-ray diffraction pattern of X-ray diffraction analysis, and by using TEMEDX if necessary.

The crystallized glass contains, for example, $MgAl_2O_4$, $MgTi_2O_4$, $MgTi_2O_5$, $Mg_2TiO_4$, $Mg_2SiO_4$, $MgAl_2Si_2O_8$, $Mg_2Al_4Si_5O_{18}$, $Mg_2TiO_5$, $MgSiO_3$, $NaAlSiO_4$, $FeAl_2O_4$, and one or more selected from solid solutions thereof, as the crystal phase.

An average crystal diameter in the crystallized glass is, for example, 4 to 15 nm, and may be 5 to 13 nm or 6 to 10 nm. If the average crystal diameter is small, a surface roughness Ra after polishing may be smoothly processed to a several Å level. In addition, a transmittance increases.

A composition range of each component included in the crystallized glass is described below. A content of each component is each expressed by wt % in terms of oxide herein unless otherwise specified. Here, "in terms of oxide" means, if it is assumed that all the components included in the crystallized glass are dissolved and converted into oxides and a total weight of the oxides is 100 wt %, an amount of oxides in each of the components contained in the crystallized glass is expressed by wt %.

The crystallized glass serving as the base material preferably contains, by wt % in terms of oxide, 40.0% to 70.0% of a $SiO_2$ component,
11.0% to 25.0% of an $Al_2O_3$ component, 5.0% to 19.0% of a $Na_2O$ component,
0% to 9.0% of a $K_2O$ component,
1.0% to 18.0% of one or more selected from a MgO component and a ZnO component,
0% to 3.0% of a CaO component, and
0.5% to 12.0% of a $TiO_2$ component.

The $SiO_2$ component is more preferably contained in an amount of 45.0% to 65.0%, and still more preferably 50.0% to 60.0%.

The $Al_2O_3$ component is more preferably contained in an amount of 13.0% to 23.0%.

The $Na_2O$ component is more preferably contained in an amount of 8.0% to 16.0%. The $Na_2O$ component may be contained in an amount of 9.0% or more or 10.5% or more.

The $K_2O$ component is more preferably contained in an amount of 0.1% to 7.0%, and still more preferably 1.0% to 5.0%.

The one or more selected from the MgO component and the ZnO component is more preferably contained in an amount of 2.0% to 15.0%, still more preferably 3.0% to 13.0%, and particularly preferably 5.0% to 11.0%. The one or more selected from the MgO component and the ZnO component may be the MgO component alone, the ZnO component alone, or both of the components, but preferably the MgO component alone.

The CaO component is more preferably contained in an amount of 0.01% to 3.0%, and still more preferably 0.1% to 2.0%.

The $TiO_2$ component is more preferably contained in an amount of 1.0% to 10.0%, and still more preferably 2.0% to 8.0%.

The crystallized glass may contain 0.01% to 3.0% (preferably 0.03% to 2.0%, more preferably 0.05% to 1.0%) of one or more selected from the $Sb_2O_3$ component, the $SnO_2$ component, and the $CeO_2$ component.

The above blending amounts may be combined as appropriate.

The crystallized glass may contain the total of: one or more selected from the $SiO_2$ component, the $Al_2O_3$ component, the $Na_2O$ component, the MgO component, and the ZnO component; and the $TiO_2$ component, in an amount of 90% or more, preferably 95% or more, more preferably 98% or more, and still more preferably 98.5% or more.

The crystallized glass may contain the total of: one or more selected from the $SiO_2$ component, the $Al_2O_3$ component, the $Na_2O$ component, the $K_2O$ component, the MgO component, and the ZnO component; the CaO component; the $TiO_2$ component; and one or more selected from the $Sb_2O_3$ component, the $SnO_2$ component, and the $CeO_2$ component, in an amount of 90% or more, preferably 95% or more, more preferably 98% or more, and still more preferably 99% or more. The crystallized glass may consist only of these components.

The crystallized glass may or may not contain a $ZrO_2$ component as long as the effect of the present disclosure is not impaired. The blending amount may be 0 to 5.0%, 0 to 3.0%, or 0 to 2.0%.

As long as the effect of the present disclosure is not impaired, the crystallized glass may or may not contain a $B_2O_3$ component, a $P_2O_5$ component, a BaO component, a FeO component, a $SnO_2$ component, a $Li_2O$ component, a SrO component, a $La_2O_3$ component, a $Y_2O_3$ component, a $Nb_2O_5$ component, a $Ta_2O_5$ component, a $WO_3$ component, a $TeO_2$ component, and a $Bi_2O_3$ component. The blending amount of each of the components may be 0 to 2.0%, 0 or more and less than 2.0%, or 0 to 1.0%.

The crystallized glass according to the present disclosure may or may not contain, as a clarifying agent, a $Sb_2O_3$ component, a $SnO_2$ component, and a $CeO_2$ component, and in addition, an $As_2O_3$ component, and one or more selected from the group consisting of F, Cl, NOx, and SOx. It is noted that a content of the clarifying agent is preferably 0.5% or less, more preferably 0.2% or less, and most preferably 0.1% or less.

The crystallized glass serving as the base material preferably contains, by mol % in terms of oxide,
43.0 mol % to 73.0 mol % of a $SiO_2$ component,
4.0 mol % to 18.0 mol % of an $Al_2O_3$ component,
5.0 mol % to 19.0 mol % of a $Na_2O$ component,
0 mol % to 9.0 mol % of a $K_2O$ component,
2.0 mol % to 22.0 mol % of one or more selected from a MgO component and a ZnO component,
0 mol % to 3.0 mol % of a CaO component, and
0.5 mol % to 11.0 mol % of a $TiO_2$ component.

The crystallized glass may contain the total of: one or more selected from the $SiO_2$ component, the $Al_2O_3$ component, the $Na_2O$ component, the MgO component, and the ZnO component; and the $TiO_2$ component, in an amount of 90 mol % or more, preferably 95 mol % or more, more preferably 98 mol % or more, and still more preferably 99 mol % or more.

Other components not described above may be added to the crystallized glass according to the present disclosure, if necessary, as long as the characteristics of the crystallized glass according to the present disclosure are not impaired. For example, the crystallized glass (and the substrate) according to the present disclosure may be colorless and transparent, but may be colored as long as the characteristics of the crystallized glass are not impaired.

There is a tendency to refrain from using each component of Pb, Th, Tl, Os, Be and Se, which are considered in recent years as harmful chemical substances, and therefore, preferably, the glass does not substantially contain these components.

[Producing Method]

The crystallized glass substrate according to the present disclosure may be produced by the following method. That is, raw materials are uniformly mixed and the mixed raw materials are melting and forming to produce a raw glass. Next, the resultant raw glass is crystallized to produce a crystallized glass base material. Further, the crystallized glass base material is chemically strengthened.

The raw glass is treated by heat to precipitate crystals in the glass. The raw glass may be treated by heat at a one-stage temperature or a two-stage temperature.

The two-stage heat treatment includes a nucleation step of firstly treating the raw glass by heat at a first temperature and a crystal growth step of treating, after the nucleation step, the raw glass by heat at a second temperature higher than that in the nucleation step.

In the one-stage heat treatment, the nucleation step and the crystal growth step are continuously performed at the one-stage temperature. Typically, the temperature is raised to a predetermined heat treatment temperature, is maintained for a certain period of time after reaching the predetermined heat treatment temperature, and is then lowered.

The first temperature of the two-stage heat treatment is preferably 600° C. to 750° C. A retention time at the first temperature is preferably 30 minutes to 2000 minutes, and more preferably 180 minutes to 1440 minutes.

The second temperature of the two-stage heat treatment is preferably 650° C. to 850° C. A retention time at the second temperature is preferably 30 minutes to 600 minutes, and more preferably 60 minutes to 300 minutes.

When the heat treatment is performed at the one-stage temperature, the heat treatment temperature is preferably 600° C. to 800° C., and more preferably 630° C. to 770° C. A retention time at the heat treatment temperature is preferably 30 minutes to 500 minutes, and more preferably 60 minutes to 300 minutes.

A thin plate-shaped crystallized glass base material may be produced from the crystallized glass base material by using, for example, grinding and polishing means.

Thereafter, a compressive stress layer is formed on the crystallized glass base material through ion exchange by a chemical strengthening method.

The crystallized glass base material is chemically strengthened by a mixed molten salt (in a mixed bath) of a potassium salt and a sodium salt, and after being strengthened in the mixed bath, is further chemically strengthened by a single molten salt (in a single bath) of a potassium salt. Specifically, for example, the crystallized glass base material is contacted with or immersed in a molten salt obtained by heating a salt containing potassium or sodium, for example, a mixed salt or a composite salt such as potassium nitrate ($KNO_3$) and sodium nitrate ($NaNO_3$), to 350 to 600° C. (preferably 380 to 570° C., more preferably 400 to 500° C., and still more preferably 430 to 490° C.), for 100 minutes or more, for example, 200 to 800 minutes, preferably 300 to 700 minutes, and more preferably 450 to 550 minutes. The mixing ratio of the potassium salt and the sodium salt is, for example, 1:1 to 50:1, 1.5:1 to 30:1, or 2:1 to 20:1, or 3:1 to 15:1 by weight ratio. Subsequently, the crystallized glass base material is preferably contacted with or immersed in a molten salt obtained by heating a salt containing potassium, for example, potassium nitrate ($KNO_3$), to 380 to 550° C. (more preferably 400 to 500° C., still more preferably 430 to 490° C.) for a short period of time, for example, 1 minute or more, 3 to 40 minutes, 4 to 30 minutes, or 5 to 20 minutes. With such chemical strengthening, an ion exchange reaction between a component present near the surface and a component contained in the molten salt proceeds. As a result, the compressive stress layer is formed on a surface portion.

EXAMPLES

Examples 1 and 2

Raw materials such as oxides, hydroxides, carbonates, nitrates, fluorides, chlorides, and metaphosphate compounds corresponding to a raw material of each component of the crystallized glass were selected, and the selected raw materials were weighed and mixed uniformly to have the following composition ratios.
(wt % in Terms of Oxide)

A $SiO_2$ component is 54%, an $Al_2O_3$ component is 18%, a $Na_2O$ component is 12%, a $K_2O$ component is 2%, a MgO component is 8%, a CaO component is 1%, a $TiO_2$ component is 5%, and a $Sb_2O_3$ component is 0.1%

Next, the mixed raw materials were fed into and melted in a platinum crucible. Subsequently, the molten glass was stirred and homogenized, cast into a mold, and slowly cooled to produce raw glass.

The obtained raw glass was subjected to a one-stage heat treatment (at 650 to 730° C., for five hours) for nucleation and crystallization to produce crystallized glass serving as a base material. As a result of analyzing the obtained crystallized glass with a 200 kV field emission transmission electron microscope FE-TEM (JEM 2100F manufactured by JEOL Ltd.), precipitated crystals having an average crystal diameter of 6 to 9 nm were observed. Further, a lattice image was recognized through an electron diffraction image and the obtained crystallized glass was analyzed by EDX, and crystal phases of $MgAl_2O_4$ and $MgTi_2O_4$ were recognized. Crystal diameters of crystal particles in a range of 180×180 $nm^2$ were determined by using a transmission electron microscope to calculate an average crystal diameter.

The produced crystallized glass base material was cut and ground, and opposing sides of the produced crystallized glass base material were polished so as to be parallel to each other, to obtain substrates having a thickness of 0.61 mm and 0.54 mm. The crystallized glass base material was colorless and transparent.

The crystallized glass base material of which opposing sides were polished so as to be parallel to each other was chemically strengthened to obtain the crystallized glass substrate. Specifically, in Example 1, the crystallized glass base material was first immersed in a mixed molten salt of $KNO_3$ and $NaNO_3$ having a mixing ratio of $KNO_3$:$NaNO_3$=3:1 (weight ratio) at 460° C. for 500 minutes, and then immersed in a molten salt containing only $KNO_3$ at 460° C. for 15 minutes. In Example 2, the crystallized glass base material was chemically strengthened in the same manner as in Example 1, except that the mixing ratio of $KNO_3$ and $NaNO_3$ was $KNO_3$:$NaNO_3$=10:1 (weight ratio).

The obtained substrate was evaluated as follows.

(1) A thickness of the compressive stress layer (stress depth DOLzero) of the crystallized glass substrate and a surface compressive stress value from the outermost surface of the compressive stress layer to DOLzero were measured by using a glass surface stress meter FSM-6000LE manufactured by Orihara Industrial Co., Ltd. A refractive index of 1.54 and an optical elastic constant of 29.658 [(nm/cm)/MPa] of the samples were used to calculate the thickness of the compressive stress layer and the surface compressive stress value. The gradient A (MPa/μm) of the surface compressive stress from the outermost surface to a depth of 6 μm and the gradient B (MPa/μm) of the surface compressive stress from a depth of (stress depth DOLzero—10 μm) to the stress depth DOLzero were determined. A central compressive stress value (CT) was determined by using curve analysis. Furthermore, the thickness of the compressive stress layer (stress depth DOL) was also determined by linear analysis. The results are shown in Table 1.

(2) The hardness obtained when the substrate was pressed from the outermost surface of the substrate to depths of 20 nm, 50 nm, 100 nm, and 200 nm was measured by using a nanoindentation system (TI Premier) manufactured by Bruker. The results are shown in Table 1.

(3) The crystallized glass substrate was subjected to a ball drop test using sandpaper by the following method. The ball drop test mimicked a fall onto asphalt.

Sandpaper having a roughness of #180 was placed on a marble base, and the crystallized glass substrate (length 15 cm×width 7 cm) was placed on the sandpaper. Next, an iron ball made from stainless steel having a weight of 16.5 g was dropped onto the substrate from a height of 10 mm (1 cm) from the substrate. If the substrate did not break after the drop, the height was increased by 10 mm (1 cm) and the test was continued in much the same way until the substrate was broken. After the substrate was broken, the state of the pieces was observed. The results are shown in Table 2. "Not broken" indicates that the substrate did not break, and "broken" indicates that the substrate broke.

The state of the pieces was evaluated according to the following criteria. The results are shown in Table 2.

A: 4 or more pieces of 1 cm² or larger, or 1 or more pieces of 10 cm² or larger
B: 1 to 3 pieces of 1 cm² or larger
C: 0 pieces of 1 cm² or larger (only fine pieces of less than 1 cm²)

From Table 2, it can be understood that the substrate according to the present disclosure is hard and not likely to break, and even if it is broken, the substrate is unlikely to break into small pieces.

Comparative Examples 1 and 2

Amorphous glass was used in Comparative Examples 1 and 2.

Raw materials such as oxides, hydroxides, carbonates, nitrates, fluorides, chlorides, and metaphosphate compounds corresponding to a raw material of each component of the glass were selected, and the selected raw materials were weighed and mixed uniformly to have the following composition ratios.

(wt % in Terms of Oxide in Comparative Example 1)

A $SiO_2$ component is 62.4%, an $Al_2O_3$ component is 21%, a $Na_2O$ component is 12%, a $K_2O$ component is 0.1%, a MgO component is 1.5%, a $B_2O_3$ component is 2.9%, and a $Sb_2O_3$ component is 0.1%

(wt % in Terms of Oxide in Comparative Example 2)

A $SiO_2$ component is 62.2%, an $Al_2O_3$ component is 16%, a $Na_2O$ component is 8.3%, a $K_2O$ component is 5.7%, a MgO component is 4.8%, a $B_2O_3$ component is 2.9%, and a $Sb_2O_3$ component is 0.1%

Next, the mixed raw materials were fed into and melted in a platinum crucible. Subsequently, the molten glass was stirred and homogenized, cast into a mold, and slowly cooled to produce raw glass.

The obtained raw glass was annealed to remove a strain remaining in the glass. The produced amorphous glass base material was cut and ground, and opposing sides of the produced amorphous glass base material were polished so as to be parallel to each other, to obtain an amorphous glass base material having a thickness of 0.66 mm. The amorphous glass base material was colorless and transparent.

The amorphous glass base material of which opposing sides were polished so as to be parallel to each other was chemically strengthened to obtain an amorphous glass substrate. Specifically, in Comparative Example 1, the amorphous glass base material was first immersed in a mixed molten salt of $KNO_3$ and $NaNO_3$ having a mixing ratio of $KNO_3:NaNO_3=2:1$ (weight ratio) at 450° C. for 300 minutes, and then immersed in a molten salt containing only $KNO_3$ at 450° C. for 15 minutes. In Comparative Example 2, the amorphous glass base material was first immersed in a mixed molten salt of $KNO_3$ and $NaNO_3$ having a mixing ratio of $KNO_3:NaNO_3=1:1$ (weight ratio) at 450° C. for 500 minutes, and then immersed in a molten salt containing only $KNO_3$ at 410° C. for 15 minutes.

The obtained substrate was evaluated as follows.

(1) A thickness of the compressive stress layer (stress depth DOLzero) of the amorphous glass substrate and a surface compressive stress value from the outermost surface of the compressive stress layer to DOLzero were measured by using a glass surface stress meter FSM-6000LE manufactured by Orihara Industrial Co., Ltd. In Comparative Example 1, a refractive index of 1.50 and an optical elastic constant of 30.3 [(nm/cm)/MPa] of the samples were used to calculate the thickness of the compressive stress layer and the surface compressive stress value. In Comparative Example 2, a refractive index of 1.51 and an optical elastic constant of 28.2 [(nm/cm)/MPa] of the samples were used to calculate the thickness of the compressive stress layer and the surface compressive stress value. The gradient A (MPa/μm) of the surface compressive stress from the outermost surface to a depth of 6 μm and the gradient B (MPa/μm) of the surface compressive stress from a depth of (stress depth DOLzero—10 μm) to the stress depth DOLzero were determined. The central compressive stress value (CT) was determined by using curve analysis. Furthermore, the thickness of the compressive stress layer (stress depth DOL) was also determined by linear analysis. The results are shown in Table 1.

(2) An indentation hardness was measured in much the same way as in Examples 1 and 2. The results are shown in Table 1.

(3) A ball drop test was performed in much the same way as in Examples 1 and 2. The results are shown in Table 2.

TABLE 1

|  | Ex. 1 | Ex. 2 | Com. Ex. 1 | Com. Ex. 2 |
|---|---|---|---|---|
| Material thickness [mm] | 0.61 | 0.54 | 0.66 | 0.66 |
| CS [MPa] | 993.3 | 1027.8 | 841.5 | 828.7 |
| CT [MPa] | 43.9 | 55.4 | 67.9 | 33.0 |
| DOLzero [μm] | 54.0 | 41.5 | 75.7 | 62.3 |
| Outermost surface to 6 μm [ΔMPa] | 567.3 | 453.7 | 225.8 | 486.8 |
| Gradient A | 94.6 | 75.6 | 37.6 | 81.1 |
| DOLzero - 10 to DOLzero [ΔMPa] | 42.8 | 95.5 | 33.1 | 20.6 |
| Gradient B | 4.3 | 9.6 | 3.3 | 2.1 |
| DOL [μm] from linear analysis | 64.0 | 57.3 | 84.0 | 90.4 |
| Hardness at indentation depth 20 nm [GPa] | 8.44 | 8.94 | 6.94 | 7.08 |
| Hardness at indentation depth 50 nm [GPa] | 8.75 | 8.72 | 7.45 | 7.13 |
| Hardness at indentation depth 100 nm [GPa] | 8.81 | 8.75 | 7.60 | 7.13 |
| Hardness at indentation depth 200 nm [GPa] | 8.94 | 8.83 | 8.03 | 7.50 |

TABLE 2

|  |  | Ex. 1 | Ex. 2 | Com. Ex. 1 | Com. Ex. 2 |
|---|---|---|---|---|---|
| Result of steel ball drop test (mm) | 10 | Not broken | Not broken | Not broken | Not broken |
|  | 20 | Not broken | Not broken | Not broken | Not broken |
|  | 30 | Not broken | Not broken | Not broken | Broken |
|  | 40 | Not broken | Not broken | Broken |  |
|  | 50 | Not broken | Not broken |  |  |
|  | 60 | Not broken | Not broken |  |  |
|  | 70 | Not broken | Not broken |  |  |
|  | 80 | Broken | Broken |  |  |
| State of pieces |  | A | A | C | A |

Although some embodiments and/or examples of the present disclosure are described above in detail, those skilled in the art may easily apply many modifications to these exemplary embodiments and/or examples without substantial departure from the novel teachings and effects of the present disclosure. Therefore, these modifications are within the scope of the present disclosure.

All the contents of the literature described in the specification are incorporated herein.

What is claimed is:
1. A crystallized glass substrate including a surface with a compressive stress layer,
wherein a gradient A of a surface compressive stress from an outermost surface to a depth of 6 μm in the compressive stress layer is 50.0 to 110.0 MPa/μm, a gradient B of a surface compressive stress from a depth of (a stress depth DOLzero—10 μm) to the stress depth DOLzero is 2.5 to 15.0 MPa/μm, where the stress depth DOLzero is a depth of the compressive stress layer at a surface compressive stress of 0 MPa, and a hardness of the outermost surface at an indentation depth of 20 nm is 7.50 to 9.50 GPa.

2. A crystallized glass substrate including a surface with a compressive stress layer, wherein a gradient A of a surface compressive stress from an outermost surface to a depth of 6 μm in the compressive stress layer is 50.0 to 110.0 MPa/μm, a gradient B of a surface compressive stress from a depth of (a stress depth DOLzero—10 μm) to the stress depth DOLzero is 2.5 to 15.0 MPa/μm, where the stress depth DOLzero is a depth of the compressive stress layer at a surface compressive stress of 0 MPa, and a hardness of the outermost surface at an indentation depth of 100 nm is 8.00 to 9.50 GPa.

3. The crystallized glass substrate according to claim 1, wherein the stress depth DOLzero is 30.0 to 70.0 μm, a surface compressive stress CS on an outermost surface of the compressive stress layer is 870.0 to 1150.0 MPa, and a central compressive stress CT is 35.0 to 70.0 MPa.

4. The crystallized glass substrate according to claim 1, comprising: by wt % in terms of oxide, 40.0% to 70.0% of a $SiO_2$ component;
11.0% to 25.0% of an $Al_2O_3$ component;
5.0% to 19.0% of a $Na_2O$ component;
0% to 9.0% of a $K_2O$ component;
1.0% to 18.0% of one or more selected from a MgO component and a ZnO component;
0% to 3.0% of a CaO component; and
0.5% to 12.0% of a $TiO_2$ component.

5. The crystallized glass substrate according to claim 1, wherein a thickness of the crystallized glass substrate is 0.1 to 1.0 mm.

6. The crystallized glass substrate according to claim 2, wherein the stress depth DOLzero is 30.0 to 70.0 μm, a surface compressive stress CS on an outermost surface of the compressive stress layer is 870.0 to 1150.0 MPa, and a central compressive stress CT is 35.0 to 70.0 MPa.

7. The crystallized glass substrate according to claim 2, comprising:

by wt % in terms of oxide,
40.0% to 70.0% of a $SiO_2$ component;
11.0% to 25.0% of an $Al_2O_3$ component;
5.0% to 19.0% of a $Na_2O$ component;
0% to 9.0% of a $K_2O$ component;
1.0% to 18.0% of one or more selected from a MgO component and a ZnO component;
0% to 3.0% of a CaO component; and
0.5% to 12.0% of a $TiO_2$ component.

8. The crystallized glass substrate according to claim 3, comprising:

by wt % in terms of oxide,
40.0% to 70.0% of a $SiO_2$ component;
11.0% to 25.0% of an $Al_2O_3$ component;
5.0% to 19.0% of a $Na_2O$ component;
0% to 9.0% of a $K_2O$ component;
1.0% to 18.0% of one or more selected from a MgO component and a ZnO component;
0% to 3.0% of a CaO component; and
0.5% to 12.0% of a $TiO_2$ component.

9. The crystallized glass substrate according to claim 2, wherein a thickness of the crystallized glass substrate is 0.1 to 1.0 mm.

10. The crystallized glass substrate according to claim 3, wherein a thickness of the crystallized glass substrate is 0.1 to 1.0 mm.

11. The crystallized glass substrate according to claim 4, wherein a thickness of the crystallized glass substrate is 0.1 to 1.0 mm.

12. The crystallized glass substrate according to claim 1, wherein a surface compressive stress CS on the outermost surface of the compressive stress layer is 900.0 to 1200.0 MPa.

13. The crystallized glass substrate according to claim 2, wherein a surface compressive stress CS on the outermost surface of the compressive stress layer is 900.0 to 1200.0 MPa.

* * * * *